Figure 1:
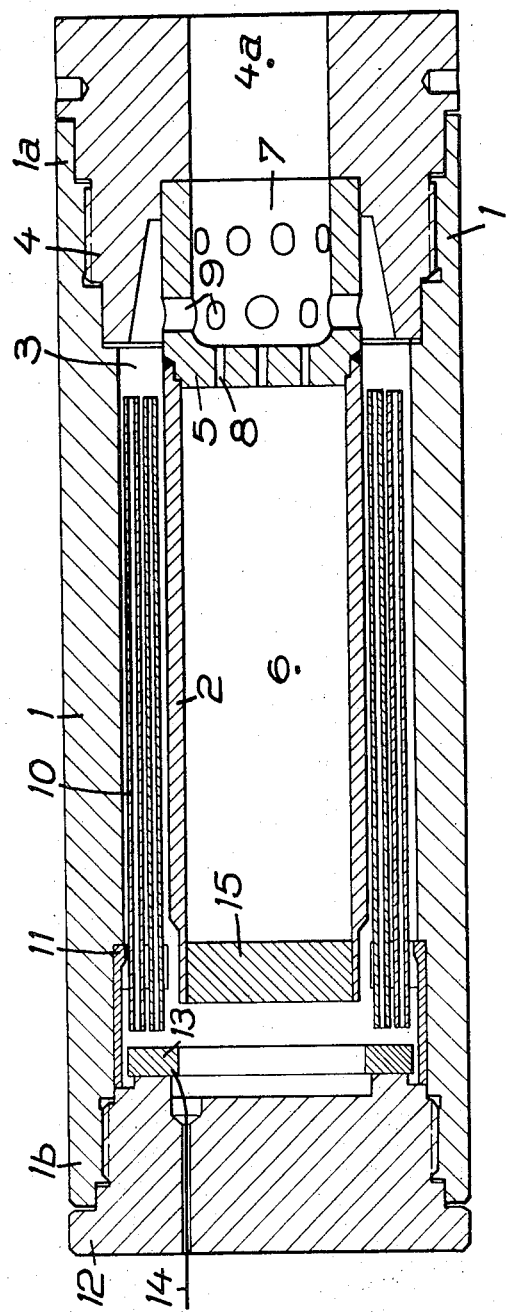

United States Patent
Doin et al.

[11] 3,813,007
[45] May 28, 1974

[54] GAS GENERATOR WITH COOLANT EXPULSION MEANS

[75] Inventors: Bernard Doin; Bernard Plantif, both of Saint-Medard-en-Jalles, France

[73] Assignee: Societe Nationale Des Poudres et Exyslosifs, Paris, France

[22] Filed: Dec. 10, 1971

[21] Appl. No.: 206,662

[30] Foreign Application Priority Data
Dec. 11, 1970 France ............................ 70.44837
Dec. 11, 1970 France ............................ 70.44839

[52] U.S. Cl. ...................... 222/4, 23/281, 222/389
[51] Int. Cl. .......................... B01j 7/00, F17c 7/00
[58] Field of Search ...................... 222/3, 5, 4, 389; 280/150 AB; 9/316; 23/281; 102/37.7, 39, 40

[56] References Cited
UNITED STATES PATENTS

| | | | |
|---|---|---|---|
| 3,232,481 | 2/1966 | Hebenstreit | 222/3 |
| 3,239,385 | 3/1966 | Meyers | 222/389 X |
| 3,305,319 | 2/1967 | Kowalick et al. | 23/281 |
| 3,450,414 | 6/1969 | Kobori | 280/150 AB |
| 3,532,359 | 10/1970 | Teague et al. | 280/150 AB |
| 3,630,412 | 12/1971 | Capener et al. | 222/4 X |

*Primary Examiner*—Stanley H. Tollberg
*Assistant Examiner*—Francis J. Bartuska

[57] ABSTRACT

This invention relates to a device comprising a reservoir for containing a liquid, a combustion chamber containing a solid propellant with an ignition device therefor, said chamber and said reservoir comprising a separating wall at least partially deformable or movable to effect a decrease in volume of the reservoir under the action of the pressure of the gases resulting from combustion of the propellant, for expelling instantaneously the said liquid from the said reservoir, calibrated orifices also being provided to place said reservoir in communication with an output tube. If desired, other calibrated orifices may be provided to link the combustion chamber with the outlet tube. This device may be used for effecting a large release of gases in a very short time, e.g., for filling an expansible bag or cushion used, for example, as a safety device for protecting the passengers of an automobile vehicle.

13 Claims, 8 Drawing Figures

GAS GENERATOR WITH COOLANT EXPULSION MEANS

It is often necessary rapidly to expel a liquid out of a reservoir or other enclosure at a high pressure.

A method which is generally used consists in enclosing the liquid in a chamber that is resistant to pressure, and in placing the latter in communication with a compressed gas reservoir in order to expel the liquid as required for use.

This use of a reservoir for gas compressed to a high degree is particularly cumbersome whenever the bulkiness and weight play an important function. Moreover, the liberation of gas under pressure requires the use of a mechanical or pyrotechnical valve which is always burdensome. Amongst the possible uses of such a method can be mentioned more particularly;

The inflation of supple reservoirs, more particularly safety cushions for automobile vehicles, by cooled gases;

The expulsion of ergols from liquid-fuel rocket tanks;

The use of extinguishers.

As regards the inflation of safety cushions for automobile vehicles, according to another known method, the gases for pressurising the liquid to be expelled result from the combustion of a powder block placed in a second enclosure resisting the pressure arranged within the liquid reservoir. During combustion of the powder block, part of the combustion gases is sent into the liquid reservoir to create an excess pressure above the said liquid and causes its expulsion from the reservoir into an output tube through an orifice in the lower part of the reservoir. However this construction necessitates the presence of two enclosures resistant to pressure, one containing the liquid to be expelled, the other serving as a powder combustion chamber, both bulky and liable to give rise to various troubles. Moreover, the apparatus employing this method only operates in a single well defined position.

It is an object of the present invention to remedy or alleviate the drawbacks mentioned above.

To this end, the invention provides apparatus comprising a reservoir containing liquid that may be vaporisable as desired, a combustion chamber containing a solid propellant with an ignition device therefor, said chamber and said reservoir having a separating wall which is at least partially movable, e.g., deformable, displaceable or flexible so as to decrease the volume of the reservoir under the action of the pressure of the gases resulting from combustion of the propellant, with a view to instantaneously expelling the said liquid from the said reservoir; calibrated orifices also being provided to link to said reservoir with an output tube, and if desired, other calibrated orifices are provided for linking the said combustion chamber with the said output tube.

The invention also provides a gas chamber enabling a large release of gases to be obtained in an extremely short time by combustion of a propellant and cooling of the combustion gases at a moderate temperature by evaporisation of a liquid, useful more particularly for rapid inflation of inflatable articles, more particularly safety cushions for automobile vehicles. Such a generator, comprises, in a general manner, a hollow body made from a pressure-resistant material, the interior of which is divided into two chambers, viz: a reservoir containing a vaporisable liquid and a combustion chamber containing a solid propellant with an ignition device therefor, the said combustion chamber surmounting or surrounding the said reservoir, the wall which separates the two chambers comprising at least one deformable or displaceable part to bring about a decrease in volume of the reservoir under the action of the pressure in the gases resulting from the combustion of the propellant in order to expel the liquid out of the said reservoir; the latter and said combustion chamber also communicating separately through separate calibrated orifices with a cooling chamber wherein the mixture of the combustion gases of the propellant with the liquid expelled from the reservoir and separisation of the said liquid in contact with the said gases instantaneously cause cooling of those gases. More particularly, the gas generator according to the invention comprises, firstly, a substantially cylindrical hollow body made from a pressure-resistant material, and secondly, a substantially cylindrical reservoir located within and along the axis of, the said hollow body, defining with the latter an annular combustion chamber for containing the solid propellant and an ignition device therefor, said reservoir containing the vaporisation liquid having at least one deformable or displaceable part so as to cause a decrease in volume of the reservoir, under the action of the pressure of the gases resulting from the combustion of the propellant in order to expel the liquid from the said reservoir, said reservoir and said combustion chamber communicating separately through separate calibrated orifices with a cooling chamber wherein the mixing or combustion gases with the liquid expelled from the reservoir and vaporisation of the said liquid in contact with the said gases cause instantaneous cooling of those gases.

In a first embodiment of apparatus according to the invention, the generator comprises a substantially cylindrical hollow body made from a pressure-resistant material, within and in the axis of which is mounted a substantially cylindrical reservoir made from a rigid material having an external diameter less than the internal diameter of said body, thus defining with the latter an annular combustion chamber containing a solid propellant and an ignition device therefor, said reservoir containing the vaporisable liquid, the downstream portion of said reservoir and that of said combustion chamber communicating separately through separate calibrated orifices with a cooling chamber, the upstream end of said reservoir held in communication with the upstream portion of the combustion chamber, moreover, being closed by a sliding piston capable of moving in the said reservoir from upstream to downstream thereof, under the action of the pressure of gases resulting from the combustion of the propellant in the said combustion chamber, in order to drive the liquid from said reservoir into the cooling chamber where its mixing with the combustion gases leaving the downstream portion of the combustion chamber and its vaporisation cause cooling of the said combustion gases.

According to one feature of this particular embodiment, the cooling chamber is in the form of an extension of the reservoir for vaporisable liquid from which it is separated by a transverse partition wherein calibrated orifices or injection nozzles are made which may be convergent and equipped with anti-splash nozzles and linking the said reservoir with the said cooling chamber for the passage of vaporisable liquid from the reservoir into the cooling chamber, the latter, moreover, being surrounded at least partly by the combustion chamber with which it is held in communication by radial nozzles provided in the wall of said cooling chamber at the level of the downstream portion of the combustion chamber, for the passage of the gases resulting from the combustion of the propellant from the combustion chamber into the cooling chamber.

According to a modification of this embodiment, the generator comprises a substantially cylindrical monoblock hollow body closed at its downstream end by a base having diffusion slots formed therein and at its upstream end by a separate base, a reservoir for containing the vaporisable liquid being mounted within and along the axis of the said body, said reservoir defining, with said body, an annular combustion chamber for containing the solid propellant and an ignition device therefor, and also a cooling chamber with this diffuser base, the downstream end of said reservoir communicating with said cooling chamber by lateral calibrated orifices whilst the downstream end of said combustion chamber communicates with the said cooling chamber by longitudinal calibrated orifices formed in an annular closing plate, disposed to be slightly recessed with respect to the downstream end of said reservoir.

In particular, the vaporisable liquid reservoir is formed by a cylindrical collar having an external diameter less than the internal diameter of the hollow body, the space between said hollow body and said collar forming the combustion chamber for containing the solid propellant and an ignition device therefor, which being closed downstream by an annular plate arranged to be slightly rearwards of the end of the said collar, the later being closed, at its upstream end by a piston and, at its downstream end by a base terminating a certain distance from the diffuser base of the hollow body, the space between these two bases forming the cooling chamber and communicating, firstly, with said reservoir through lateral calibrated orifices made in part of the collar around said annular plate and, secondly, with the combustion chamber through longitudinal calibrated orifices made in said annular plate, the communication between the combustion chamber and the said piston being ensured by at least one cavity formed in the separate base of the hollow body extending on both sides of the said collar and temporarily occupied by the firing charge.

According to another modification, the generator comprises a substantially cylindrical hollow body made from a pressure-resistant material within and along the axis of which is mounted a substantially cylindrical reservoir made from a supple or deformable material, having an external diameter less than the internal diameter of said body, thus defining with the latter an annular combustion chamber for containing a solid propellant and an ignition device therefor, said reservoir containing the vaporisable liquid, the downstream portion of said reservoir and that of said combustion chamber communicating separately through separate calibrated orifices with a cooling chamber, the reservoir containing the vaporisable liquid being deformed under the action of the pressure of the gases resulting from combustion of the propellant in order to expel the liquid which it contains into the cooling chamber where its mixing with the combustion gases and its vaporisation instantaneously cause cooling of the said gases.

A "double base" powder in hollow strand mounted on an annular washer can be used as a solid propellant or a powder referred to as a "corrugated cardboard" powder or one referred to as a lamellar powder, or any low combustion time powder, the specific flow of which is less than 1,500–2,000 $g/s/cm^2$ and the features of which vary slightly in dependance upon the initial firing temperature.

Moreover, an ignition device comprising a toric ignitor may be used with advantage.

In addition water may be used as the vaporisable liquid, or mixtures containing water and a lower alkanol or a diol, such as a water-methanol mixture, or a water-glycol mixture or an aqueous solution of calcium chloride.

According to another feature of the invention, the vaporisable liquid as filled into the reservoir may be conditioned in an hermetic enclosure made from an easily puncturable plastics material, provided, if desired, with areas of average thickness, points possibly being provided on the inner wall of the said reservoir to facilitate this puncturing.

According to another embodiment, the generator may be formed by two half shells made of a pressure-resistant material, assembled one on the other, and gripping therebetween a separating membrane which may be corrugated and made from a deformable material; this membrane divides the interior of the shell into two chambers one of which serves as the vaporisable liquid reservoir and the other of which serves as the combustion chamber containing a solid propellant with an ignition device therefor, said reservoir and said combustion chamber communicating separately through calibrated orifices with a cooling chamber arranged on the side of the shell on a part or whole of the periphery of this shell, a diffuser being provided, if desired, to evacuate the cooled gases from this generator.

The invention also relates to a device for expelling a liquid out of a reservoir, said device comprising a substantially cylindrical hollow body made from a pressure-resistant material, within and along the axis of which is mounted a liquid reservoir made from a substantially supple or deformable material, having an external diameter less than the internal diameter of said body, thus defining with the latter an annular combustion chamber for containing a solid propellant and an ignition device therefor, calibrated output orifices, moreover, being provided separately to evacuate the combustion gases and the liquid from the said combustion chamber and reservoir respectively.

According to a modification of this expulsion device, it may comprise a substantially cylindrical hollow body made from a pressure-resistant material, within and along the axis of which is mounted a substantially cylindrical liquid reservoir made from a rigid material defining with said body an annular combustion chamber containing a solid propellant and an ignition device therefor, said reservoir being closed in a detachable manner at one of its ends by a sliding piston capable of moving in said reservoir under the action of the pressure of gases resulting from the combustion of the propellant in order to expel the said liquid from this reservoir, calibrated output orifices also being provided separately to evacuate the combustion gases and the liquid.

According to yet another modification, the device is formed by two half shells made from a pressure-resistant material, assembled one on the other, a separating membrane being located therebetween which is possibly corrugated made from a deformable material, this membrane dividing the interior of the shell into two chambers, one of which serves as a liquid reservoir and the other of which serves as a combustion chamber containing a solid propellant and an ignition device therefor, calibrated output orifices being made separately to evacuate the combustion gases and the liquid from said combustion chamber and said reservoir respectively.

Figure 2:
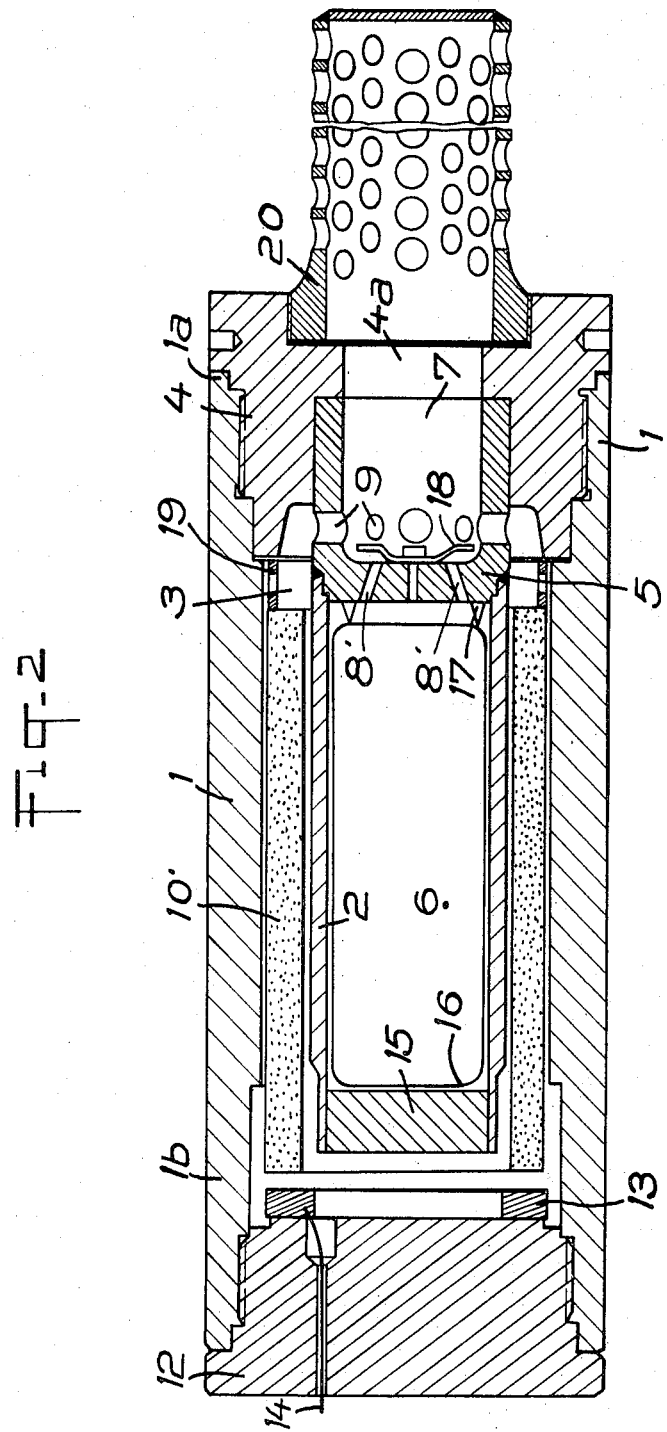
Figure 3:
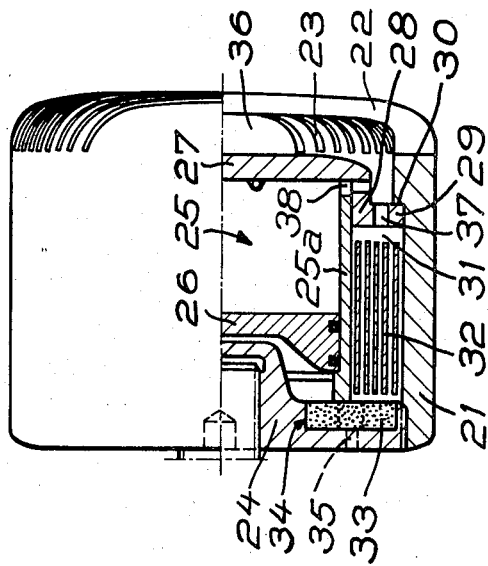
Figure 4:
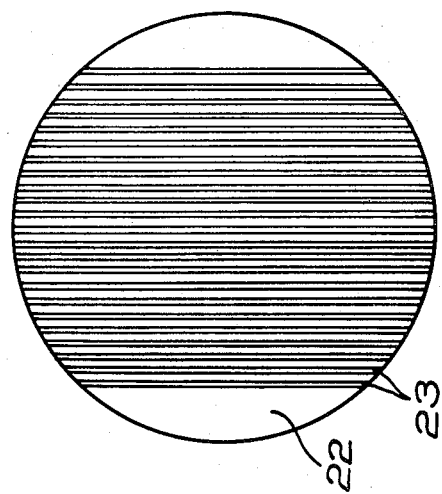
Figure 5:
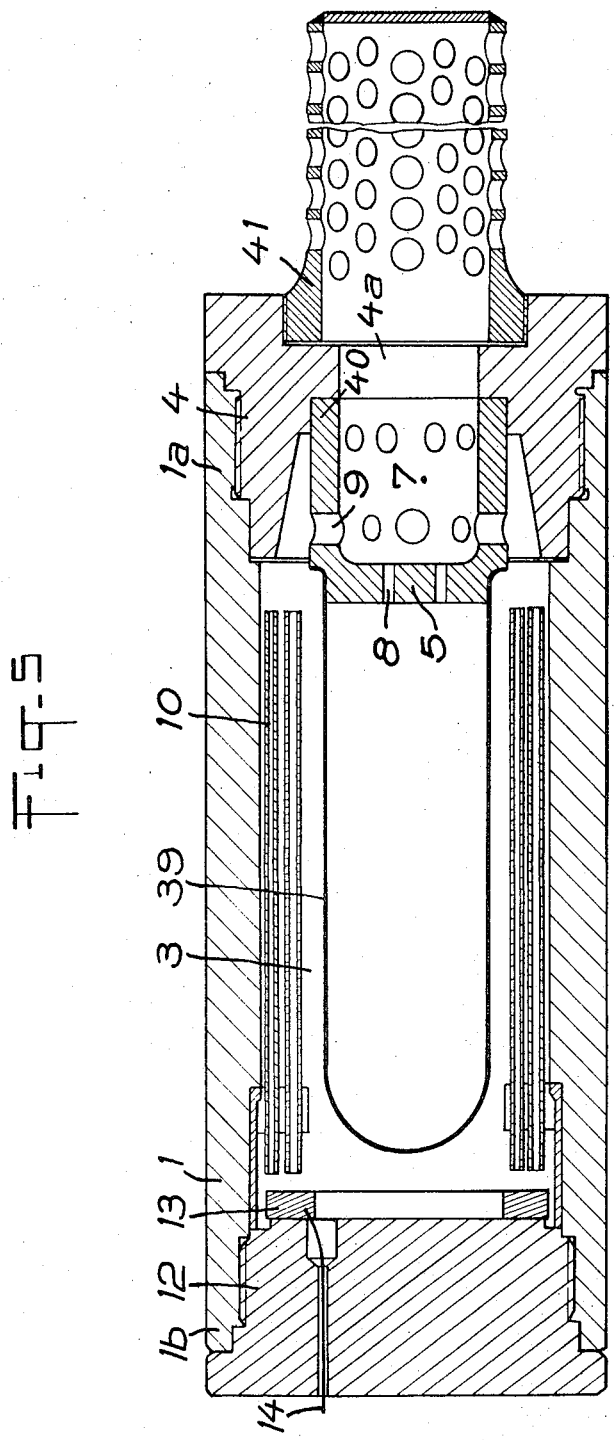
Figure 6:
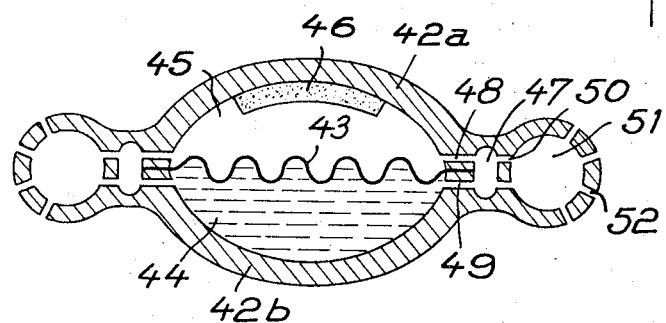
Figure 7:
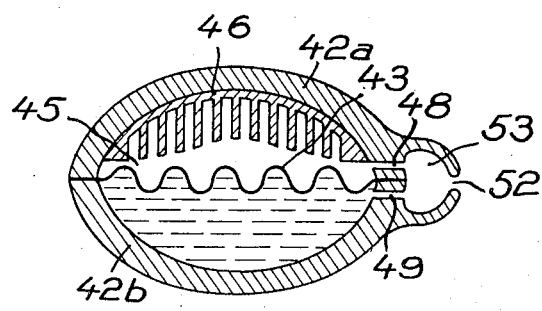
Figure 8:
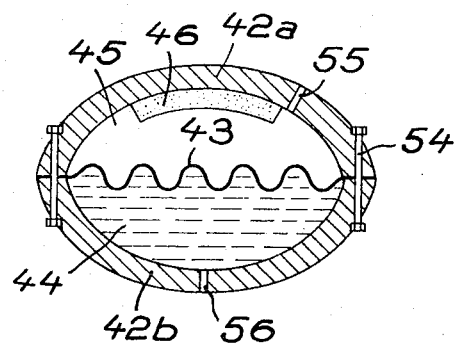

In order that the invention may be more clearly understood, reference will now be made to the accompanying drawings which show certain embodiments thereof by way of example, and in which:

FIG. 1 shows an axial section through a gas generator having a reservoir and piston according to the invention, FIG. 2 shows a modification of the generator of FIG. 1, FIG. 3 shows a view in elevation, partly in section, of a second modification of the generator of FIG. 1, FIG. 4 shows a view of the diffuser base of the generator of FIG. 3, FIG. 5 shows an axial section through a generator having a deformable reservoir according to the invention, FIG. 6 shows an axial section through a generator having a deformable membrane according to the invention, FIG. 7 shows a modification of the generator of FIG. 6, and FIG. 8 shows an axial section through a device for expelling a liquid from a reservoir according to the invention.

Referring now to FIG. 1 of the drawings, a gas generator according to the invention comprises essentially a cylindrical tubular body 1 within which is mounted, coaxially with respect to the said body, a cylindrical tubular member 2 having an external diameter less than the internal diameter of said body, thus defining with the latter an annular space 3. This tubular member is fixed at one of its ends to a threaded annular base 4 which is screwed in the threaded end 1a of the body 1. The said tubular member is, moreover, divided by a transverse partition 2 into a reservoir 6 containing a vaporisable liquid and a cooling chamber 7. The latter is in communication, on the one hand, with the said reservoir by means of injector nozzles 8 made in the said partition for the passage of the vaporisable liquid issuing from this reservoir and, on the other hand, with the annular space 3 by mean of radial nozzles 9 provided in the wall of the same cooling chamber for the passage of gases resulting from combustion of the propellant as will be described hereinafter.

Hollow streands or strips 10 of solid propellant having a double base mounted on an annular washer 11 made from plastics material are located within the annular space 3. The free end 1b of the body 1 is closed by a stopper 12 carrying a toric ignition device 13 and an electrical priming arrangement 14. The upstream end of the reservoir 6 which terminates a certain distance from the stopper 12, is closed by a piston 15 which is capable of sliding in the said reservoir from upstream to downstream thereof in order to drive back the liquid from this reservoir into the cooling chamber 7 under the action of gases resulting from combustion of the propellant in the combustion chamber which the annular space 3 forms.

During operation, the ignitor 13 is primed which ignites the propellant 10; the gases resulting from combustion of the propellant are cooled in a first stage by expansion through the radial nozzles 9 during their passage from the combustion chamber 3 to the cooling chamber 7 and in a second stage by vaporisation of the liquid issuing from the reservoir 6 and driven back by the piston 15 into the cooling chamber 7 via injector nozzles 8 under the action of the pressure of the combustion gases prevailing in the upstream end of the combustion chamber.

The gases thus cooled to a moderate temperature are evacuated from the cooling chamber through a bore 4a in the base 4 and are used at the output from this generator.

By way of example, with a generator according to the invention having a volume of 0.6 litres, with a propellant comprising 75g of a double base powder extruded in hollow strands or strips, of a potential of 1,000 calories per gram having the following composition:

| | |
|---|---|
| Nitroglycerine | 37 parts by weight |
| Nitrocellulose | 56 parts by weight |
| Stabiliser | 2 parts by weight |
| Ballistic Catalyst | 1 part by weight |
| Various pigments | 4 parts by weight | and water (120 g) as the vaporisable liquid, 180 l of gas at a pressure of 1.3 bar, a temperature of 70°–100°C is obtained at the output from the generator in a time of 20 milliseconds.

According to the modifications shown in FIG. 2 of the drawings, with a view to simplifying the loading operations of the reservoir, the vaporisable liquid is conditioned in an hermetic bag 16 made from an easily puncturable supple plastics material, for example polyethylene. If desired, zones of less thickness on the enclosure or 17 on the partition 5 may be provided to facilitate this puncturing of the enclosure.

Moreover, with a view to obtaining a better mixing in the cooling chamber 7, convergent injectors 8' and star-shaped anti-splash cap nozzles 18 are provided.

Moreover, the propellant used is then a lamellar charge 10' located directly on a support bracket 19.

Also, a diffuser 20 is mounted at the outlet from the bore 4a in order to evacuate the cooled gases from the cooling chamber 7.

According to the modifications shown in FIG. 3 of the drawings, the gas generator according to the invention comprises substantially a monoblock hollow body 21, of generally cylindrical shape, closed at its downstream end by a slightly curved base 22, made from a single piece with the said body, and having diffusion slots 23 therein whilst the downstream end of this body is blocked by a separate base 24. The diffusion slots 23 are parallel as shown in FIG. 4 but it is understood that they may all have any other desirable configuration, for example they may be concurrent, convergent or divergent.

Within the said body and along the axis thereof, is mounted a reservoir 25 containing the vaporisable liquid, formed by a cylindrical collar 25a having an external diameter less than the internal diameter of this hollow body, this collar being closed on the one hand, at its upstream end by a piston 26 and, on the other hand, at its downstream end by a circular plate 27, the latter being extended below the said collar by a circular skirt 28 provided with an annular flange 29 which abuts an inner shoulder 30 of the hollow body 21.

The annular space between the collar 25a and the body 21 forms a combustion chamber 31 containing the solid propellant 32 which is ignited by pellets 33 located in cavities 34 made in the separate base 24 and extending on both sides of the collar 25a, these pellets being initiated by an electrical priming arrangement shown diagrammatically at 35. These ignition pellets temporarily interrupt the communication between the combustion chamber and the piston 26, however the said communication is re-established following combustion of the said pellets, for example made from a powder of zirconium.

Moreover, the downstream end of the combustion chamber is in communcation with the cooling chamber 36 between the diffuser base 22 and the circular plate 27 with its skirt 28 by longitudinal nozzles 37 provided on the flange 29, whilst the interior of the reservoir 25 is placed in communication with this cooling chamber by lateral injectors 38 discharging into the said chamber, slightly beyond the flange 29.

In operation, the ignition pellets 33 are primed to ignite the propellant 32. The gases resulting from combustion of the propellant are cooled, on the one hand, by expansion through the nozzles 37 and, on the other hand, by mixing with the vaporisable liquid (and vaporisation of the latter) which is driven back from the reservoir 25 by the piston 26 via the injectors 38 into the cooling chamber 36, under the action of the pressure of the combustion gases which exists upstream of the combustion chamber and upstream of the piston 26 following combustion of the ignition pellets 33.

These gases, thus cooled to a moderate temperature, escape from the cooling chamber 36 through the diffusion slots 23 and are used at the outlet from the generator.

By way of example, with 20g of propellant having a double base and 25g of vaporisable liquid (water + calcium chloride), 60 litres of gas are obtained at the outlet from the generator at a temperature of 95°C ± 5°C at a pressure of 1 bar in a time of 14 milliseconds.

According to the embodiment shown in FIG. 5, the gas generator according to the invention comprises a substantially cylindrical tubular body 1, made from a pressure-resistant material within which is mounted, coaxially with respect to the said body, a cylindrical reservoir 39 having a spherical end, made from a deformable material, for example an aluminium alloy, of outer diameter less than the inner diameter of this body, thus defining with the latter an annular combustion chamber 3 containing the solid propellant 10. This reservoir is fitted and glued or otherwise adhered by its free end to a base 40 itself connected to an assembly screw 4 screwed in the threaded head 1a of the body 1. The said reservoir is separated from a cooling chamber 7 arranged in the said base by a partition 5. This cooling chamber is in communication, on the one hand, with the said liquid reservoir by means of injector nozzles 8 formed in the said partition with a passage of vaporisable liquid issuing from this reservoir and, on the other hand, with the combustion chamber 3 by means of radial nozzles 9 provided in the wall of the said cooling chamber for the passage of gases issuing from combustion of the propellant.

The free end 1b of the body 1 is closed by a stopper 12 carrying a toric ignitor 13 and an electrical priming arrangement 14.

During operation, the ignitor 13 is primed to fire the propellant 10; the combustion gases resulting from combustion of the propellant are cooled in a first stage by expansion through the radial nozzles 9 during the passage from the combustion chamber into the cooling chamber 7, and in a second stage by mixing with the liquid and vaporisation of the said liquid driven back from the reservoir 39 into the cooling chamber 7 via the injector nozzles, by deformation of the reservoir 2 under the action of the pressure of gases resulting from the combustion of the solid propellant in the combustion chamber 3.

The gases thus cooled to a moderate temperature, are evacuated from the cooling chamber through a diffuser 41 mounted in the bore 4a of the screw 4 and are used at the outlet of the diffuser.

By way of example, with a generator of a volume of 0.6 litres, with a propellant comprising 75 g of a powder having a double base extruded in strands or strips, having the following composition:

| | |
|---|---|
| Nitroglycerine | 37 parts by weight |
| Nitrocellulose | 56 parts by weight |
| Stabiliser | 2 parts by weight |
| Ballistic catalyst | 1 part by weight |
| Various pigments | 4 parts by weight | and with water (120 g) as vaporisable liquid, there is obtained at the level of the diffuser 180 l of gas at a pressure of 1.3 bar, at a temperature of 100°C in a time of 20 milliseconds.

In this embodiment, at the time of combustion of the propellant, evacuation of the gases of the nozzles 9 causes a pressure gradient between the two ends of the combustion chamber of approximately 10 bars, the strongest pressure existing upstream of the combustion chamber. The pressure gradient is particularly advantageous for it causes a more accentuated deformation of the upstream part of the reservoir favouring expulsion of the liquid.

According to the embodiment shown in FIG. 6, of the drawings, a gas generator according to the invention is formed from two circular half shells 42a, 42b made from a pressure-resistant material, assembled one on the other, for example by welding and gripping therebetween a deformable membrane 43, for example made of a corrugated aluminium alloy or copper, dividing the interior of the shell into two chambers, one of which at 44 forms a reservoir containing the vaporisable liquid and the other of which at 45 forms the combustion chamber containing the solid propellant 46 with its ignition device (not shown on the drawings). The combustion chamber and the liquid reservoir communicate separately with an annular cooling chamber 47 via output nozzles 48 and 49 respectively. Moreover, this cooling chamber opens, via nozzles 50, into an annular diffuser 51 carrying distribution orifices 52. The cooling chamber and the diffuser are thus adhered to the side of the shells.

During operation, the ignitor is primed to ignite the propellant 46. The combustion gases given off in the combustion chamber 45 deform the membrane 43 and drive the liquid contained in the chamber 44 through the orifices 49 back into the cooling chamber 47. The combustion gases expanded by their passage through the nozzles 48 into the chamber 47 are mixed in the latter with the expelled liquid and are cooled by vaporisation of the said liquid. The cooled gases are evacuated from the cooling chamber across the diffuser 51 and are used at the outlet from the latter.

According to the modification shown in FIG. 7 of the drawings, the gas generator is in the shape of an elongated shell and is not circular, and the cooling chamber and diffuser assembly is combined in a single chamber 53, arranged on one side of the shell and provided with outlet orifices 52. The propellant used is a lamellar charge.

According to the embodiment shown in FIG. 8, the device for expelling a liquid from a reservoir comprises two circular half shells 42a, 42b made from a pressure-resistant material, assembled one on the other by pegs 54 and gripping therebetween a deformable corrugated membrane 43, for example made from an aluminium alloy with the interposition of a sealing joint, if desired or necessary. This membrane thus divides the interior of the shell into two chambers one of which at 44, forms the reservoir containing the liquid to be expelled and the other of which at 45, forms the combustion chamber containing the solid propellant 46 with its ignition device (not shown on the drawings).

This membrane enables the possible reaction between the gases resulting from the combustion of the propellant to be avoided and the liquid to be expelled and to limit the shaking of the said liquid.

The propellant block 46 is of such dimensions as actually to supply more gas than is necessary to pressurise the enclosure, the surplus gases being evacuated through a nozzle 55; this device enables the expelling pressure of the liquid to be maintained practically constant; in fact, if the gases produced by the propellant are in large excess, the drawing-off of liquid only slightly influences the pressure in the chamber.

If necessary, with the aid of a propellant block of adapted shape, it is possible to obtain an expelling pressure which is increasing or decreasing in dependance upon the time.

The liquid outlet orifice 56 and the outlet nozzle for the gases 55 may be provided with covers which are broken under the effect of the pressure so as to enable storage of the unit.

Moreover, in the embodiment shown in FIGS. 6 to 8, the ignitor may be stuck either to the propellant units 46 or to the deformable member 43, and connected to an exterior priming arrangement by wires passing through either a sealed orifice made in the shell, or an outlet nozzle for the gases.

If desired or found necessary, the liquid may be suitably conditioned in an hermetic enclosure made of a plastics material, for example polyethylene, and filled into the reservoir before positioning of the deformable membrane.

We claim:

1. A device for effecting, in a very short time, a large release of cooled gases obtained by combustion of a propellant and cooling of the combustion gases to a moderate temperature by vaporisation of a liquid, said device comprising a hollow body made from a pressure-resistant material, the interior of which is divided by a wall into two separate chambers, said wall preventing fluid flow between said chambers, one of said chambers being a reservoir chamber containing a vaporisable liquid and the other of said chambers being a combustion chamber containing a solid propellant, an ignition device for said propellant in said combustion chamber, means forming a gas-liquid mixing chamber adjacent said two chambers, first orifice means in the wall of said reservoir chamber and extending from said reservoir chamber to said mixing chamber, second orifice means extending from said combustion chamber to said mixing chamber to permit the flow of combustion gases from said combustion chamber directly into said mixing chamber, said second orifice means being in a direction perpendicular to the flow of gases before the gases enter therein and also perpendicular to the flow of liquid, said liquid and said gases traveling perpendicularly and forming an eddy flow within the mixing chamber, said wall which separates the two chambers comprising at least one movable portion which is movable by the gases in said combustion chamber to bring about a decrease in volume of the reservoir chamber under the action of the pressure of gases resulting from the combustion of said propellant in order to expel the liquid from said reservoir chamber through said orifice means in the wall thereof into said mixing chamber, whereby upon ignition of said propellant, combustion gases and said liquid separately flow into said mixing chamber and mixing of the combustion gases of the propellant with the liquid expelled from the reservoir and vaporisation of the said liquid in contact with the said gases causes instantaneous cooling of said gases.

2. A device for effecting, in a very short time, a large release of cooled gases obtained by combustion of a propellant and cooling of the combustion gases to a moderate temperature by vaporisation of a liquid, said device comprising a hollow body made from a pressure-resistant material, the interior of which is divided by a wall into two separate chambers, said wall preventing fluid flow between said chambers, one of said chambers being a reservoir chamber containing a vaporisable liquid and the other of said chambers being a combustion chamber containing a solid propellant, and ignition device for said propellant in said combustion chamber, means forming a gas-liquid mixing chamber adjacent said two chambers, first orifice means in the wall of said reservoir chamber and extending from said reservoir chamber to said mixing chamber, second orifice means extending from said combustion chamber to said mixing chamber to permit the flow of combustion gases from said combustion chamber directly into said mixing chamber, said wall which separates the two chambers comprising at least one movable portion which is movable by the gases in said combustion chamber to bring about a decrease in volume of the reservoir chamber under the action of the pressure of gases resulting from the combustion of said propellant in order to expel the liquid from said reservoir chamber through said orifice means in the wall thereof into said mixing chamber, whereby upon ignition of said propellant, combustion gases and said liquid separately flow into said mixing chamber and mixing of the combustion gases of the propellant with the liquid expelled from the reservoir and vaporisation of the said liquid in contact with the said gases causes instantaneous cooling of said gases, wherein said hollow body is formed by two dish-like, half shells assembled one on the other to form a chamber therebetween and said wall is a separating membrane made from a deformable material and gripped between said shells, said membrane dividing the interior of the shell into said two chambers, and said mixing chamber being disposed adjacent the line of connection of said shells.

3. A device for effecting, in a very short time, a large release of cooled gases obtained by combustion of a propellant and cooling of the combustion gases to a moderate temperature by vaporisation of a liquid, said device comprising a hollow body made from a pressure-resistant material, the interior of which is divided by a wall into two separate chambers, said wall preventing fluid flow between said chambers, one of said chambers being a reservoir chamber containing a vaporisable liquid and the other of said chambers being a combustion chamber containing a solid propellant, an ignition device for said propellant in said combustion chamber, means forming a gas-liquid mixing chamber adjacent said two chambers, first orifice means in the wall of said reservoir chamber and extending from said reservoir chamber to said mixing chamber, second orifice means extending from said combustion chamber to said mixing chamber to permit the flow of combustion gases from said combustion chamber directly into said mixing chamber said wall which separates the two chambers comprising at least one movable portion which is movable by the gases in said combustion chamber to bring about a decrease in volume of the reservoir chamber under the action of the pressure of gases resulting from the combustion of said propellant in order to expel the liquid from said reservoir chamber through said orifice means in the wall thereof into said mixing chamber, whereby upon ignition of said propellant, combustion gases and said liquid separately flow into said mixing chamber and mixing of the combustion gases of the propellant with the liquid expelled from the reservoir and vaporisation of the said liquid in contact with the said gases causes instantaneous cooling of said gases, wherein said hollow body is cylindrical and said wall which divides the interior of said body into two separate chambers have a substantially cylindrical, hollow portion co-axial with said body and of an exterior diameter less than the interior diameter of said body to define an annular combustion chamber intermediate said body and said cylindrical portion and wherein said mixing chamber is at one end of said cylindrical portion and said movable portion of said wall is a piston slidably mounted in said cylindrical portion of said wall at the end thereof remote from said mixing chamber and is slidable axially of said cylindrical portion under the pressure of said gases.

4. A device as claimed in claim 3, wherein said mixing chamber is formed by an extension of said cylindrical portion of said wall and is separated from said reservoir chamber by a partition transverse to the axis of said cylindrical portion, wherein said orifice means extending from said reservoir chamber to said mixing chamber is a plurality of injection nozzles extending through said partition, said mixing chamber being within and spaced from the interior wall of said body whereby said mixing chamber is at least partly surrounded by said combustion chamber and wherein said orifice means extending from said combustion chamber to said mixing chamber comprises a plurality of radially extending nozzles in the portion of the mixing chamber wall surrounded by said combustion chamber.

5. A device as claimed in claim 4, wherein said injection nozzles are convergent.

6. A device as claimed in claim 4, wherein said injection nozzles have anti-splash means as a part thereof and within said mixing chamber.

7. A device as claimed in claim 3, wherein said hollow body is a substantially cylindrical monoblock hollow body closed at one end by a base pierced with diffusion slots and at its other end by a separate base, wherein said cylindrical portion is closed at the end thereof adjacent said pierced base by a partition spaced from said pierced base to form said mixing chamber therebetween, wherein said combustion chamber has at one end thereof an annular plate extending around said cylindrical portion and between said cylindrical portion and the interior wall of said body, said plate being spaced from said pierced base a distance greater than the spacing of said partition from said pierced base to thereby provide an extension of said mixing chamber around said cylindrical portion, wherein said orifice means extending from said reservoir chamber to said mixing chamber comprises a plurality of radially extending orifices in said cylindrical portion intermediate said partition and said plate and wherein said orifice means extending from said combustion chamber to said mixing chamber comprises a plurality of orifices extending through said annular plate.

8. A device as claimed in claim 7, wherein the opposite end of said cylindrical portion is closed by a piston slidably mounted therein and spaced from at least a portion of said separate base to permit gases from said combustion chamber to enter therebetween.

9. A device as claimed in claim 3, wherein said cylindrical portion is made of a material deformable by the gases in said combustion chamber.

10. A device as claimed in claim 3, wherein the solid propellant is a powder selected from the group of solid propellants consisting of a double base powder in hollow strands, a corrugated cardboard powder, a lamellar powder and a low combustion time powder, the specific flow of which is less than $1,500$–$2,000 g/s/cm^2$ and the gas generating characteristics of which vary in dependence upon the initial firing temperature.

11. A device as claimed in claim 3, wherein the ignition device comprises a toric ignitor.

12. A device as claimed in claim 3, wherein the vaporisable liquid is selected from the group consisting of water and mixture of water and a lower alkanol, a mixture of water and a diol, a water methanol mixture, a water glycol mixture, and an aqueous solution of calcium chloride.

13. A device as claimed in claim 3, wherein said liquid is enclosed in a hermetically sealed enclosure made from easily puncturable plastics material, said enclosure being received in said reservoir chamber.

* * * * *